(12) United States Patent
He et al.

(10) Patent No.: US 11,604,682 B2
(45) Date of Patent: Mar. 14, 2023

(54) PRE-EMPTIVE CONTAINER LOAD-BALANCING, AUTO-SCALING AND PLACEMENT

(71) Applicant: EMC IP Holding Company LLC, Hopkinton, MA (US)

(72) Inventors: Xuebin He, Westwood, MA (US); Amy N. Seibel, Newton, MA (US); Himanshu Arora, Boston, MA (US); Victor Fong, Medford, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 28 days.

(21) Appl. No.: 17/139,210

(22) Filed: Dec. 31, 2020

(65) Prior Publication Data
US 2022/0206873 A1   Jun. 30, 2022

(51) Int. Cl.
*G06F 9/50* (2006.01)
*G06F 11/32* (2006.01)
*G06F 11/34* (2006.01)

(52) U.S. Cl.
CPC ............ *G06F 9/5083* (2013.01); *G06F 9/505* (2013.01); *G06F 11/328* (2013.01); *G06F 11/3409* (2013.01); *G06F 11/3452* (2013.01)

(58) Field of Classification Search
CPC . G06F 9/5083; G06F 11/3409; G06F 11/3452
See application file for complete search history.

(56) References Cited

U.S. PATENT DOCUMENTS

| | | | |
|---|---|---|---|
| 10,410,155 B2* | 9/2019 | Das | G06F 11/3452 |
| 11,307,885 B1* | 4/2022 | Luciano | G06F 9/5088 |
| 11,416,306 B1* | 8/2022 | Gussin | G06F 9/5077 |
| 2012/0131594 A1* | 5/2012 | Morgan | G06F 9/5072 718/105 |
| 2015/0256481 A1* | 9/2015 | Turovsky | H04L 67/10 709/226 |
| 2019/0102213 A1* | 4/2019 | Yousaf | H04L 43/20 |
| 2020/0082316 A1* | 3/2020 | Megahed | G06N 7/00 |
| 2020/0341798 A1* | 10/2020 | Duleba | G06F 9/45558 |
| 2021/0263779 A1* | 8/2021 | Haghighat | G06F 9/5061 |
| 2021/0271517 A1* | 9/2021 | Guim Bernat | G06N 3/08 |

* cited by examiner

*Primary Examiner* — Benjamin C Wu
(74) *Attorney, Agent, or Firm* — Workman Nydegger

(57) ABSTRACT

A resource usage platform is disclosed. The platform performs preemptive container load balancing, auto scaling, and placement in a computing system. Resource usage data is collected from containers and used to train a model that generates inferences regarding resource usage. The resource usage operations are performed based on the inferences and on environment data such as available resources, service needs, and hardware requirements.

16 Claims, 7 Drawing Sheets

```
{
    "container_id": "F25FC7AE-CFCC-4DE1-A527-71D1AB434532",
    "snapshot": [
        {
            "timestamp": "Tue Feb 25 14:26:12 EST 2020",
            "timespan": "60s",
            "memory": "10MB",
            "cpu_model": "Intel (R) Core (TM) i7-6700K CPU @ 4.00GHz",
            "cpu": "2.7",
            "gpu_model": "AMD Radeon R9 M390",
            "gpu": "4.1",
            "network": "10GB",
            "disk": "100GB"
        },
    ]
}
```

PRE-EMPTIVE CONTAINER LOAD-BALANCING, AUTO-SCALING AND PLACEMENT

FIELD OF THE INVENTION

Embodiments of the present invention generally relate to computing resources. More particularly, at least some embodiments of the invention relate to systems, hardware, software, computer-readable media, and methods for resource management and/or resource usage operations.

BACKGROUND

Container applications are being used to break traditional monolithic applications into smaller microservices or functions. More specifically, large monolithic applications require a large quantity of pre-defined computing resources that may not be dynamic in nature. Installing the large application, for example, requires a certain amount of memory.

When the application is implemented using multiple containers, however, those same resources could be used more efficiently. In fact, the resource requirements Lu of one microservice or function may be very different from the resource requirements of other microservices or functions. For example, a function that processes graphics may need a graphics processing unit (GPU) while other functions that are not graphics intensive may require different or fewer resources.

Even if a containerized application uses resources more efficiently or more dynamically, managing those resources is complicated and there are a number of issues with regard to tracking resource usage and/or forecasting resource requirements. For example, the ability to share the resource usage of a function or container is very difficult. It is also difficult to determine, in advance, the resources that a function or container will require. In essence, it is hard to understand the resource requirements of all containers and to automatically schedule the containers to run in an optimal environment.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2B discloses aspects of telemetry data;

DETAILED DESCRIPTION OF SOME EXAMPLE EMBODIMENTS

Figure 1:
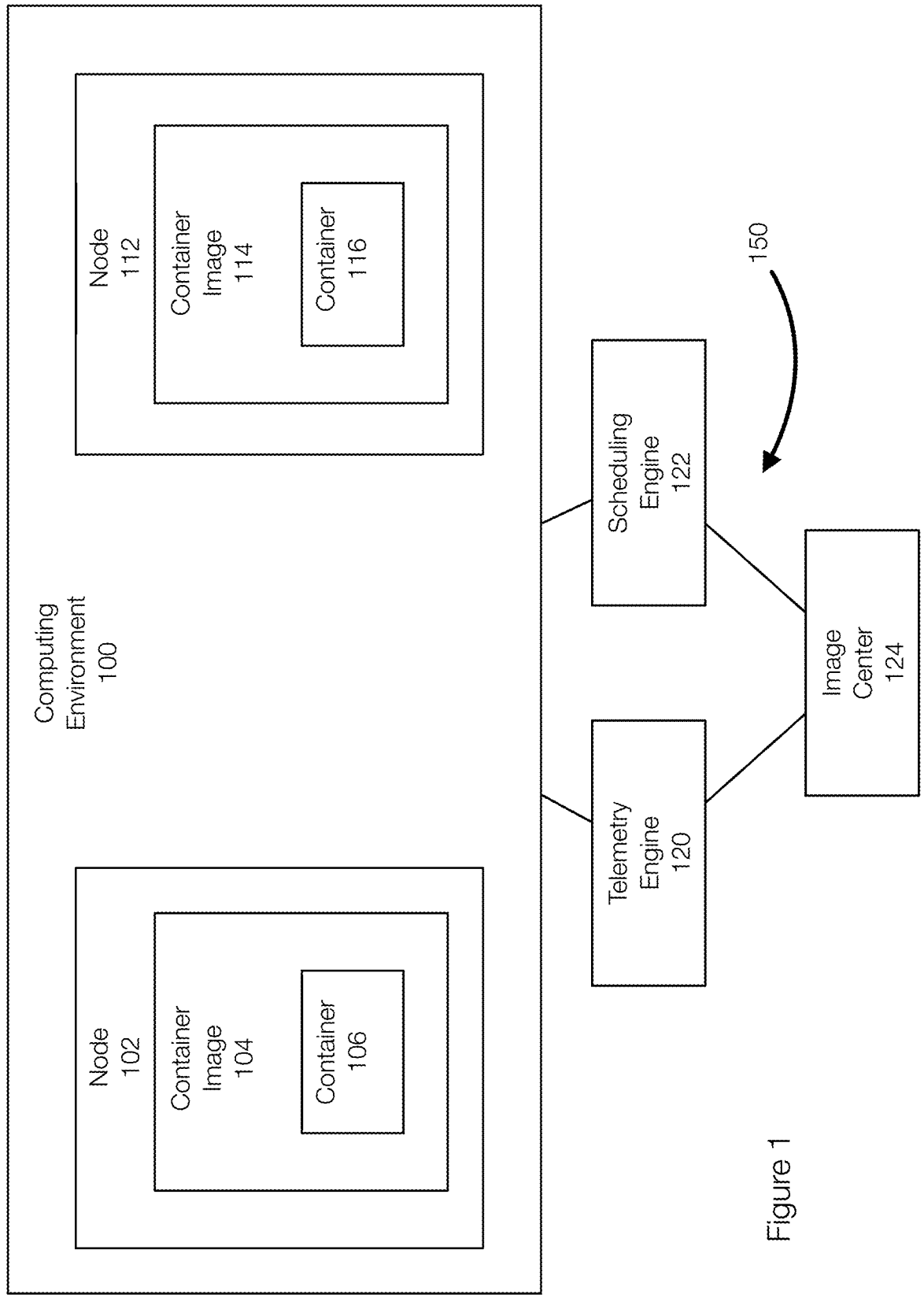
FIG. 1 discloses aspects of a computing environment including a resource management platform configured to perform resource usage operations.

Embodiments of the present invention generally relate to computing resource management, usage, and scheduling. More particularly, at least some embodiments of the invention relate to systems, hardware, software, computer-readable media, and methods for resource usage operations (also referred to as scheduling operations) such as, but not limited to, tracking resource usage, load balancing operations, auto-scaling operations, scheduling operations, and placement operations.

In general, example embodiments of the invention relate to a mechanism of system for tracking resource usage of a container or a microservice (or the like) that include functions or that perform other workloads. Embodiments of the invention are discussed with respect to functions that are implemented as containers or microservices, but embodiments of the invention are not limited thereto and can be implemented in other platforms.

Embodiments of the invention track the usage of computing resources by functions operating in a computing system and are able to share the resource usage of LU those functions. The resource usage, represented by telemetry data, can be tracked over time and may include time series datasets. The telemetry data can be collected and used to perform resource usage operations.

The telemetry data can be processed and can be attached to container images, used to train models that predict resource usage, or the like. By attaching telemetry data to a container image or by training a model to predict resource requirements, a scheduler can select an execution environment for a container and can schedule the computing resources that are available in the computing system.

Examples of resource usage operations include at least pre-emptive container load-balancing, auto-scaling, and placement in the cloud environment and/or at the edge environment.

Embodiments of the invention may track the resource usage of an individual function within a container and attach or associate a prediction model (e.g., a machine learning model) to the container or the container image. The telemetry data, which is the collected resource usage data in one example, enables container management. In addition, the telemetry data is used to schedule a requested function (e.g., placement, timing, deployment) so that function performance and resource (e.g., hardware) usage efficiencies are improved if not optimized.

Embodiments of the invention facilitate the sharing of telemetry data. The telemetry data from multiple functions can be continually or repeatedly collected and a resource management platform can centralize the telemetry data. Collecting the telemetry data in this manner allows the telemetry data to be shared and introduces LU efficiency into container management and scheduling.

An application may be associated with multiple containers or functions and each of the functions may have unique resource requirements (e.g., hardware requirements) or preferences. For example, one function may need more memory resources than CPU (Central Processing Unit) resources compared to the average level while another function may require substantial GPU (Graphic Processing Unit) resources. Because resource usage data is available, scheduling a container to run on the best environment is facilitated by considering the resource usage information. In addition, embodiments of the invention are able to predict resource needs and ensure that loads are properly balanced while also ensuring that resources are sufficient for existing containers already running in the computing system. In other words, based on the resource usage data (i.e., the telemetry data), resource usage models, and other factors, containers can be load balanced, scaled, placed, etc., on appropriate nodes of the computing system.

A container platform, such as Kubernetes, can form a cluster of nodes to run containers. The resources of those nodes could be the same or different based on the needs of the cluster itself. Each node may have resources to run hundreds or thousands of containers at the same time. This could cause a lot of uncertainty in aggregating information about available resources, especially on a FaaS or serverless platform, because each container may have a short lifecycle. The ability to predict upcoming resource requirements or needs, helps ensure that loads are properly balanced.

Embodiments of the invention also facilitate the use of third-party services. LU Many containerized functions, for example, may rely on services such as a database, a message queue, a stream service, or the like. In order to run such functions, the required services need to be set up first, which is normally a manual and time-consuming process. Embodiments of the invention allow these needs to be known in advance and this knowledge further improves the operation of the functions, improves set up time, and helps to effectively manage the available computing resources.

When operating machine learning models, particularly at edge deployments, streaming telemetry data to a centralized location may consume unnecessary bandwidth. Embodiments of the invention ensure that bandwidth is used efficiently.

Embodiments of the invention allow resource usage to be predicted using telemetry data collected from operating containers or functions. Predicting the resources that will be needed allows schedulers to maximize scheduling and hardware performance. In addition, the predictions can be reinforced continuously using new telemetry data to improve the prediction. Also, federated learning can be applied to continuously train from many edge nodes or devices running embodiments of the resource management platform.

Embodiments of the inventions perform resource usage operations with a telemetry service (or engine), a scheduling service (or engine) and an image center. These components of the resource management platform cooperate to perform resource management operations. These components may operate in a centralized manner. These components can also operate in a distributed manner, such as at edge installations.

FIG. 1 illustrates an example of a computing system for performing resource management operations. FIG. 1 illustrates a computing system 100. The computing system 100 includes nodes (e.g., a cluster of nodes), illustrated as nodes 102 and 112, which may be server computers or other hardware. The computing system 100 may include a container deployment system, such as Kubernetes.

The nodes 102 and 112 include hardware resources, which may include by way of example only, memory, CPU, GPU, bandwidth, or the like or combination thereof.

The node 102 may be configured to run containers, represented by the container 106. The container 106 may be an instantiation of a container image 104, which may be downloaded to the node 102 from a repository or registry, such as the image center 124. Similarly, the node 112 is configured to run containers, illustrated as the container 116, which is an instantiation of the container image 114.

FIG. 1 also illustrates a resource management platform 150, which may include a telemetry engine 120, a scheduling engine 122, and/or an image center 124. The telemetry engine 120, the scheduling engine 122, and/or the image center 124 may operate on or include server computers or other hardware and may be remote from or integrated with the computing environment 100, by way of example only. The telemetry engine 120 is configured to collect telemetry data from each of the containers 106 and 116. The telemetry engine 120 may collect, as telemetry data by way of example only and not limitation, container input, CPU usage, GPU usage, bandwidth usage, memory usage, other resource usage data, or the like or combination thereof of each container on each node. The telemetry data collected by the telemetry engine 120 is an example of resource usage data. Processed, combined, or aggregated telemetry data is another example of resource usage data.

Figure 2A:
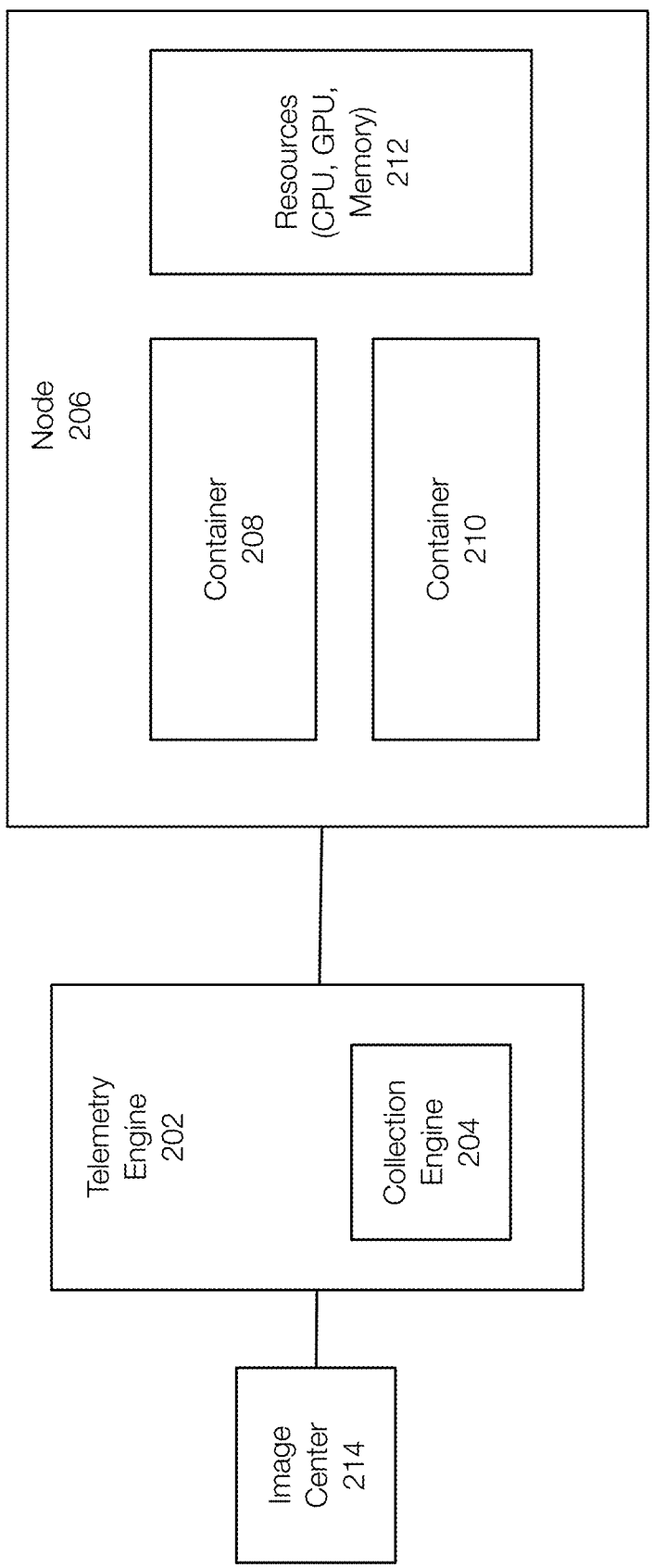
FIG. 2A discloses aspects of a telemetry engine configured to collect and process telemetry data related to resource usage operations.

FIG. 2A illustrates an example of a telemetry engine. The telemetry engine 202, which is an example of the telemetry engine 120, is configured to communicate with nodes such as the node 206 and the image center 214, which is an example of the image center 124.

In this example, containers 208 and 210 are running on the node 206 and are using resources 212 of the node 206. The telemetry engine 202, which includes a collection engine 204, is configured to collect the telemetry data from the node 206 related to at least the resources 212 and send the collected telemetry data to the image center 214. More specifically, the collection engine 204 is configured to collect telemetry data that describes or quantifies which of the resources 212 are used by each the containers 208 and 210. The telemetry data collected by the collection engine 204 may be formatted in a format such as JSON (JavaScript Object Notation).

In one example, the collection engine 204 may take resource utilization snapshots of each container 208 and 210 running on the node 206 to collect the telemetry data. These snapshots may be taken periodically (e.g., every few seconds). An example snapshot or an example of the telemetry data is illustrated in FIG. 2B. FIG. 2B illustrates telemetry data 200 that includes, for a specific container or a specific function, resource usage data such as a timestamp, a timespan, memory, CPU metadata, GPU metadata, network, and disk (memory). Snapshots may be taken for each container operating on each node of the computing system. Successive snapshots may be processed into time series data.

The telemetry engine 202 is configured, in addition to collecting the telemetry data, is configured to determine resource usage data (e.g., processed telemetry data). Raw telemetry data may also be used as resource usage data. The telemetry engine 202, which may also be present or running on a node or a centralized server, may use tools of a host operating system.

For example, the CPU usage for each container can be calculated using tools such as sysstate or mpstate. If there is an "Intel Core i7 CPU @ 4.00 GHz" being used or shared by a container, then a 2.7 CPU accumulated utilization indicates that 10.8 G of CPU is used. Similarly, other resources such as GPU, disk, and memory can be determined or calculated from the telemetry data. CPU resource usage data could be based on time (e.g., percentage of CPU time/cycles used by each container), based on CPU capacity, or the like. The calculation may account for both user space and kernel space usage.

For each container, the telemetry engine 202 may take several snapshots of different timespans and then aggregate the collected snapshots. The aggregated data and/or each snapshot and associated calculations may be provided to the image center 214. The data may be aggregated by summing the results from each snapshot. The data may be time series data of the resource usage, or the like.

Figure 3:
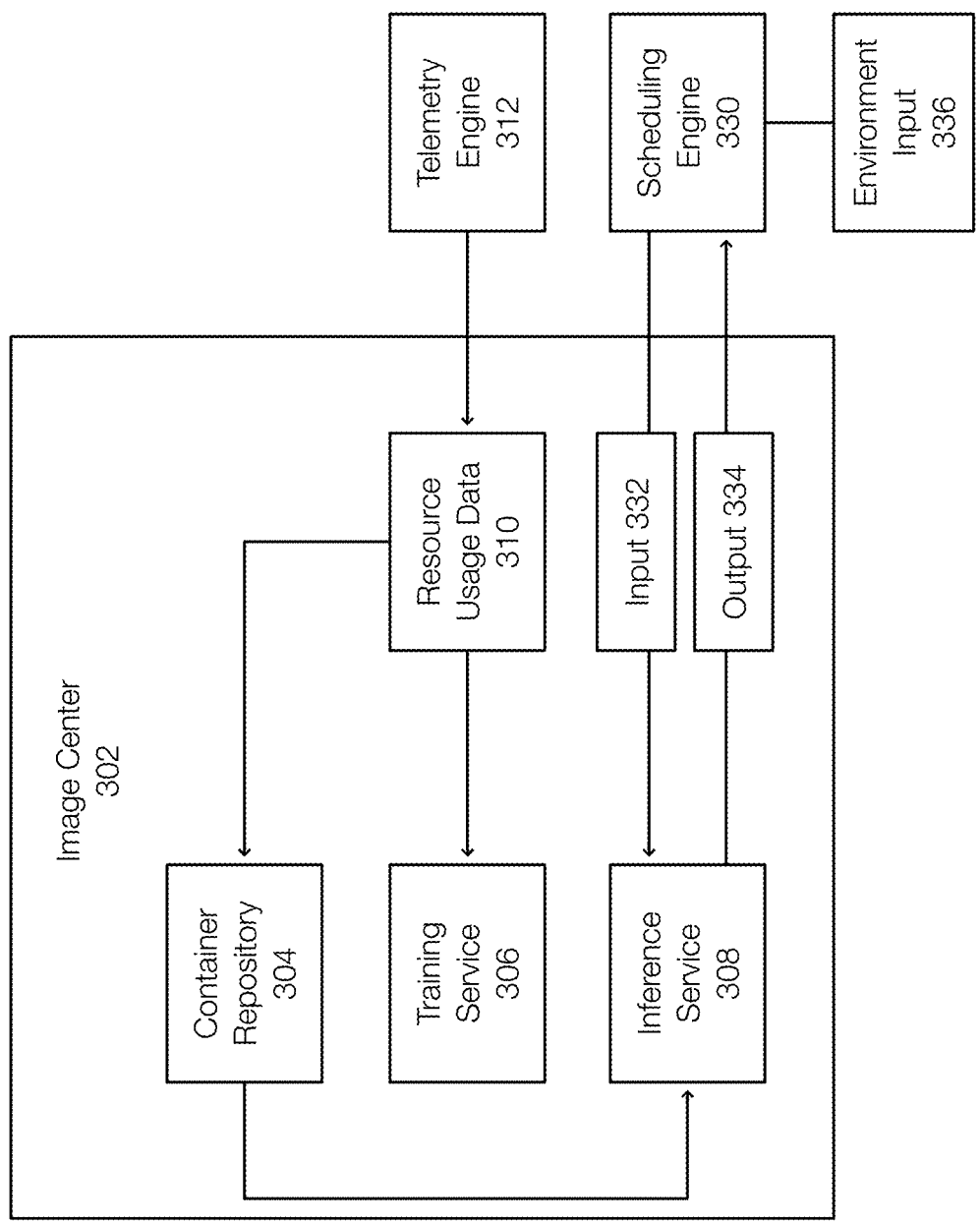
FIG. 3 discloses aspects of an image center and a scheduling engine and LU their operation when performing resource usage operations.

FIG. 3 illustrates an example of an image center. The image center 302 is an example of the image center 124. The image center 302 may include a container repository 304 that stores container images. When a request for a container is made, the requested container may be retrieved from the container repository 304 and delivered in accordance with the request. In another example, the requested container may already be running on one or more of the nodes in the computing system.

The image center 302 also receives resource usage data 310 (e.g., raw and/or processed telemetry data), which may also be stored in storage, from the telemetry engine 202. Each time the image center 302 receives new resource usage data 310, the resource usage data 310 may be categorized and/or added to already stored resource usage data 310. The resource usage data 310 or portions thereof can be categorized based on resource type, function, function or container class, size or the like.

The telemetry engine 202 may collect telemetry data from multiple containers on multiple nodes. The resource usage data 310 can be container or function specific. This allows, for example, data from two instances of the same function to be aggregated. This also allows the resource usage data 310 to be organized, sorted, categorized, and the like based on various factors such as function, function version, function class, or based on one or more resources such as CPU or GPU.

The resource usage data 310 for an executing container can be added to or associated with the corresponding container image in the repository 304. A history of resource usage data may aid the scheduling engine 330 when performing various resource usage operations. The updated resource usage data 310 may be stored in the Lu container image as a key value pair.

The image center 302 may also include or provide a training service 306 and an inference service 308. The training service 306 may include machine learning (e.g., a neural network or other model). The neural network may be trained as a predictive model to predict or infer resource requirements. The neural network or other artificial intelligence may be trained using the resource usage data 310 that is collected by the telemetry engine 202. In one example, multiple neural networks may be used: one for each function, class of functions, or the like.

The resource usage data 310 may include time-series data based on container execution and deep learning can be performed using the resource usage data 310. The model that is trained using the resource usage data 310 can thus predict the resources that any particular container or function may require. Further, the model may be able to account for other factors such as size of workload, type of computing resource (e.g., processor clock speed, cores, etc.), input type or other input characteristics.

In one example, the resource usage data 310 allows a model or a neural network to be trained using various inputs such as the requested container and/or other inputs such as resource usage data. The resource usage data 310 or portion thereof (e.g., a category of resource usage data, function specific resource usage data, or the like) can be used as input to the training service 306 and/or as labels. Once a model is trained (the training can be repeated as new resource usage data becomes available), a trained model (e.g., the inference service 308) can be used to generate a prediction based on similar input. A request to execute a function may identify a function and the input. The inference service 308 can generate a prediction of the resources required for the function, including execution time, based on the requested container or function and the request input. The inference service 308 may be configured to receive various inputs including resource usage data or telemetry data, aspects of the workload (e.g., type, size), execution times, or the like or combination thereof.

In another example, the inference service 308 may rely on or be a historical table (implemented for example as a hash table) that can be used to match input (e.g., requested container, and/or expected input) with the historical data (e.g., telemetry data for the same or similar container). A historical table may be effective for containers with limited input variety. The table can be accessed, based on the input, to determine the potential resource requirements. Machine learning improves upon a table.

The inference service 308 is configured to generate a prediction. Thus, rather than training a model, the inference service 308 may use a trained model to generate an inference or prediction. In particular, the inference may predict the resource requirements or needs of a particular container or function. When a request for a function is generated, the inference service 308 can use the request as input to predict the needed resources, including execution time.

In some embodiments, the scheduling engine 330 (an example of the scheduling engine 122) may receive a request or be invoked in response to a request to run a container. The scheduling engine 330 may invoke the inference service 308 and provide an input 332 that includes or identifies the requested container, the input to the container, resource usage data, or combination thereof. The inference service 308 may generate an output 334, which may be a prediction of the resources needed to serve the request and run the container. The inference or prediction may also indicate execution time, or the like. Thus, the inference service 308 and the scheduling engine 330 may be part of a request path. The scheduling engine 330 may decide whether or not to invoke the inference service 308.

Based on the output 334 or inference from the inference service 308, the scheduling engine 330 can continue the process of scheduling the request. In one example, the scheduling engine 330 may also receive environment input 336. The environment input 336 may include information regarding the resources available on each of the nodes in the computing system in which containers are being executed, the resources currently consumed by each existing container on each node and the resources available on each node. The environment input 336 may also include container running times or average running times, real-time telemetry data, and the like. This allows the scheduling engine 330 to not only be aware of available resources on each node, but also be aware of resources that will be available on each node.

The scheduling engine 330 may evaluate various options to service the request: (1) execute the request in an existing container and determine which container, (2) create a new container in an optimal node and determine which node, or (3) reject the request.

If no container is running the function associated with the request, the first option (1) is skipped. If one or more containers are running the requested function, the scheduling engine 330 may then determine which container can handle the request based on the prediction (e.g., the output 334) and/or the environment input 336 (e.g., the real-time telemetry from each container and node). If none of the running containers can be used, the first option is skipped. If a container running the same function can handle the request, the request is routed to that container.

With regard to the second option (2), the scheduling engine 330 may select a node on which to create a container based on the environment input 336 and/or the resource prediction (e.g., resources available on each node and the prediction from the inference service regarding resource usage). If no node can handle the request or handle a new container, this indicates that the current computing system does not have the resources to handle the request and the request is rejected in the third option (3). The rejected function could, however, be rescheduled into a different computing environment, in an edge environment or the like.

Figure 4:
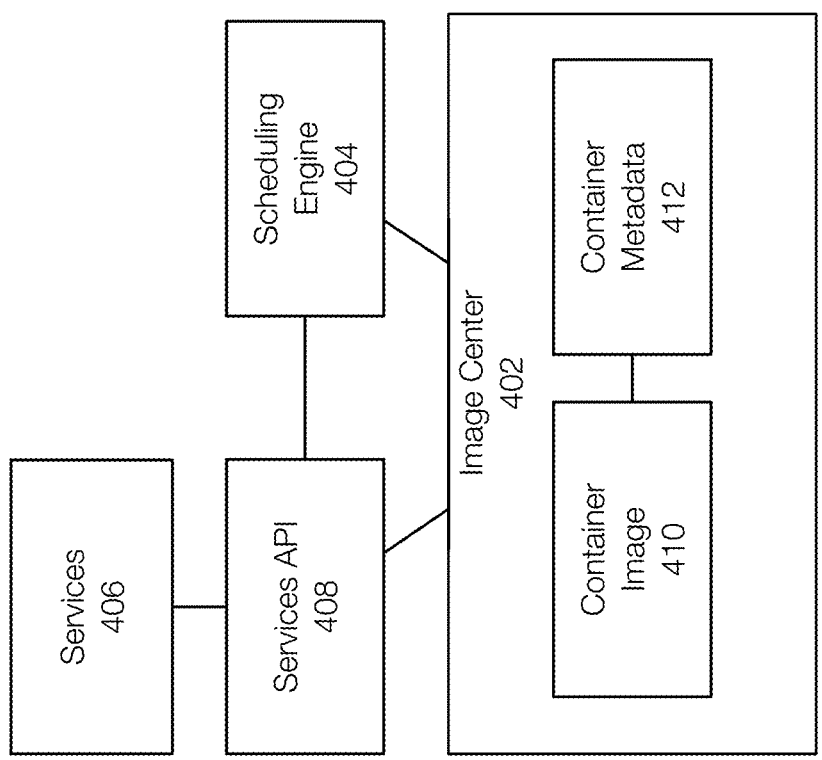
FIG. 4 discloses additional aspects of the image center and the scheduling engine.

FIG. 4 discloses aspects of container services. FIG. 4 illustrates an example of an image center 402 that stores a container image 410. The container image 410 is associated with container metadata 412. The container metadata 412 may identify or include, by way of example only, predictive models needed to run or schedule the container, services needed by the container, hardware requirements, resource usage data, and the like. More specifically, a developer may specify, in the metadata 412, services, hardware requirements and the like. The metadata 412 can be considered by the scheduling engine 404 when scheduling the container for execution.

For example, the metadata 412 may specify a need for a database, disk storage, or the like. The scheduling engine 404 may be able to access services 406 (e.g., a marketplace of services) via a services API (Application Programming Interface) 408 to acquire and instantiate the services during scheduling. The scheduling engine 404 can bind any needed services to the container automatically and without manual intervention.

In addition, the metadata 412 may specify hardware requirements. The requirements can be soft (not required but preferred) or hard (required). A soft requirement may be a GPU. A hard requirement may be a database, which may be one of the services 406. This may depend on circumstance.

In addition to a centralized platform, other embodiments of the resource usage platform may be edge based or used in multiple edge deployments. In this example, the inference service executes on the edge site to provide real-time predictions or inferences based on the request input. This allows the scheduling engine to perform placement or scheduling accordingly at the edge deployment.

In addition, federated learning can be added to edge deployments. In this example, the telemetry engine and the training service are located in the edge deployment. Insights generated from the training service, rather than the telemetry data, may be transmitted back to a centralized image center periodically. This reduces bandwidth and reduces the need for communication between the edge sites and the image center. A model at the image center can be updated to the edge sites periodically. The central model may also be trained using inferences from multiple edge deployments. The edge sites can also apply localized models for further refinement and improvement at the edge sites.

Figure 5:
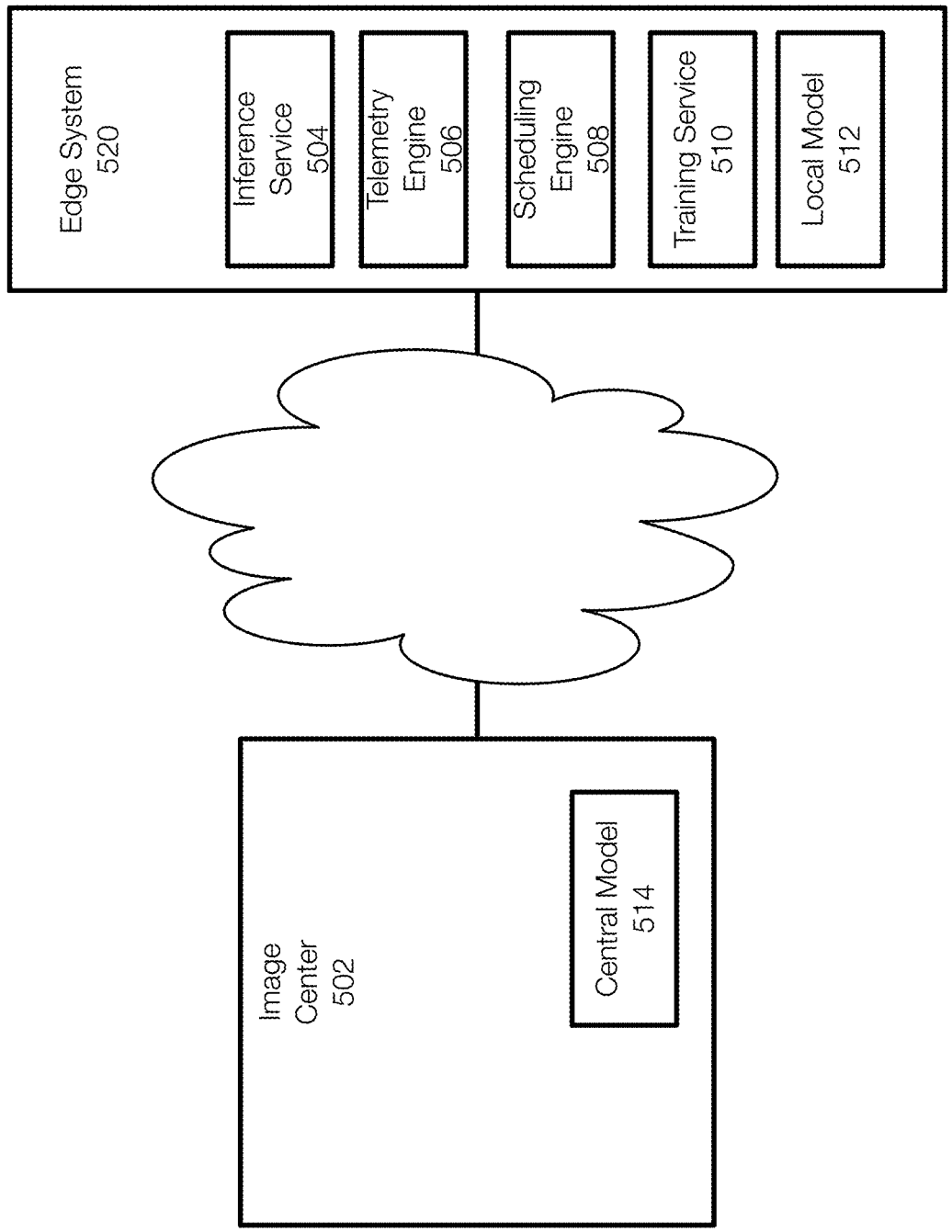
FIG. 5 discloses aspects of an edge deployment for a resource management platform.

FIG. 5 illustrates an example of an edge deployment. In this example, the inference service 504, telemetry engine 506, scheduling engine 508 and training service 510 are deployed to an edge system 520. The edge system 520 may also include a copy of a central model 514 and/or a local model 512. It may be possible to deploy an image center or portion thereof the edge system 520.

In this example, the inference service 504 is performed at the edge site to provide real-time predictions based on a requested input so that the scheduling engine 508 can perform scheduling operations such as container placement. In addition, the edge system 520 facilitates federated learning, particularly where there are multiple edge systems. Because each edge system 520 includes a telemetry engine 506, a training service 510, and an inference service 504, insights generated from the inference service 504 can be transmitted back to the image center 502. This may reduce bandwidth required for communications between the edge system 520 and the image center 502. Using the insights generated by the inference service 504, the central model 514 can be updated in a federated manner from all edge systems and the central model 514 can itself be periodically updated at the edge sites.

Figure 6:
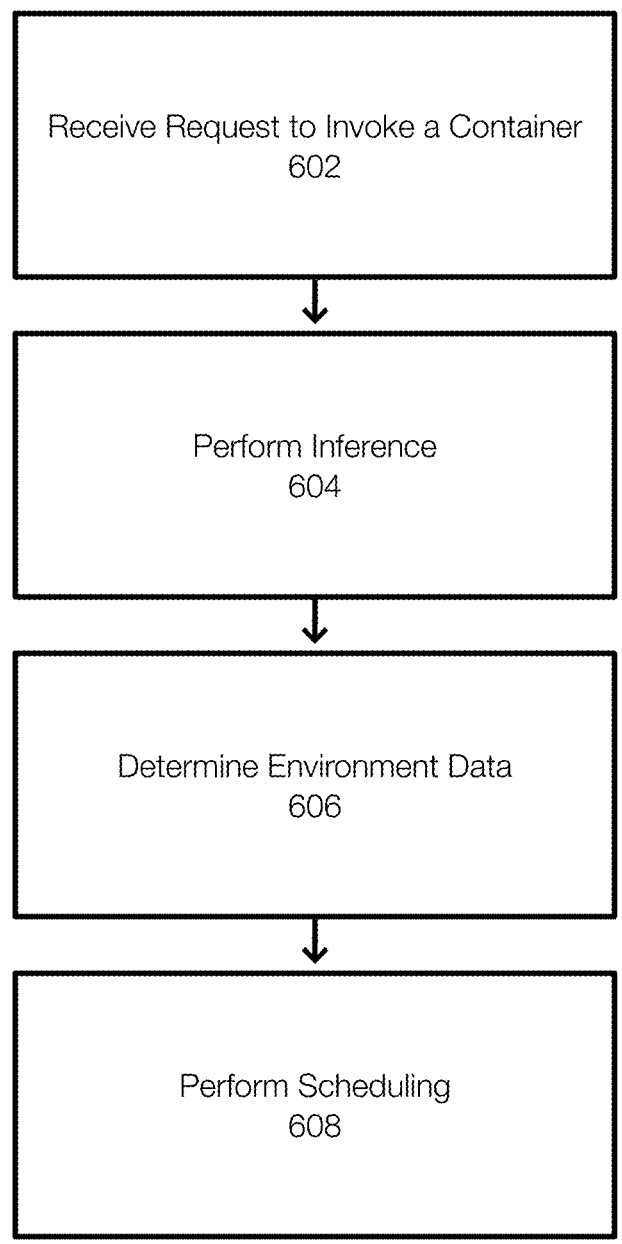
FIG. 6 discloses aspects of a method for performing resource usage operations or scheduling operations in a resource management platform.

FIG. 6 discloses aspects of methods for performing resource usage or scheduling operations. In one example, a request to invoke 602 a container (or function or the like) is received. The request may be received by the platform, an application, by the scheduling engine or the like. In response to the request, an inference is performed 604 using an inference service. The inference may identify or predict the resources (e.g., Lu CPU, GPU, memory, execution time, etc.) expected to be consumed or needed by the requested function.

Next, environment data is determined 606 or accessed by or input to the scheduling engine. The environment data allows the scheduling engine to understand what containers or functions are presently running and on which nodes, what resources are available at which nodes, when resources are expected to be available, which existing containers perform the same or suitable function, and the like. The scheduling engine may also determine whether a third-party service is needed and begin the process of binding the service to the function if necessary.

Once the inference and the environment data are available or input to the scheduling engine, scheduling is performed 608 and the function may be deployed accordingly. For example, when scheduling the container, an existing running container may be used if available and if resources are sufficient. A new container may be instantiated at an appropriate location or node. Alternatively, the request could be rejected or delayed if necessary.

Embodiments of the invention track resource usage of containers, share the resource usage of containers or make the resource usage of containers centrally available, provide a machine learning model to predict the resource consumption or needs of a function/container, and other resource usage operations such as load balancing and load placement. Embodiments of the invention provide a scalable platform that can perform resource usage or scheduling operations effectively. The platform provides a scalable way to share resource usage with at least platform providers, infrastructure providers, developers, and the like. This ensures that functions or containers are scheduled more efficiently.

Data related to third party services may be attached to a container image. Many functions or running containers are not standalone functions and may depend on third party services (e.g., database). To start a container for this type of workload, the third-party service needs to be ready or bound to the function or container. Information about these services are available to the scheduling engine and this allows the scheduling to be automated. The developer of the container image can attach the information of required third-party services to the container image. With this information from the container image, the container scheduling engine can automate the process on third-party services delivery.

Conventionally, operators must traditionally prepare services and manifests manually to enable platforms like Kubernetes to coordinate containers. Embodiments of the invention attach third-party requirements to the container image such that container scheduling can be performed automatically. This would enable platforms such as Kubernetes to automate the third-party services aspect of container deployments. Other information pertaining to the functions, such as resource usage data, could similarly be attached to container images.

The framework or platform disclosed herein can aggregate container resource usage data at the image center or in an image registry. More specifically, the resource usage of a container will be monitored and captured when the container is running. During the lifecycle of the container, the telemetry engine will constantly or LU periodically collect the resource usage data of each container and send the collected resource usage data to the image center. The image center will aggregate the received data with the stored data from previously reported data of the same image to optimize the accuracy of the usage data. In this way, the aggregated data will give a better reflection of how much resources the container would use, resulting in insights that support intelligent container scheduling.

Thus, the platform captures function-specific container resource usage information and aggregates the resource usage over a period of time. The aggregated data can also be combined with third-party service information, shared with others, and used in the scheduling process.

The scheduling engine can use the data or information attached to the container images to schedule a container instance. For example, once the process of collecting resource usage data has been done many times for a container, an aggregate resource usage data and list of required third-party services may be attached to the container image. With this information, the scheduler can find nodes that have third-party services available and have enough resources for that container in an automated and intelligent manner. Knowing usage data of the existing running containers on a node, the scheduler can predict the available resources in the near future, which will help to find the optimum node from among the candidates.

Categorization data may also be attached to the container image. The parameters of a function, for example, may be categorized. The resource consumption for a function or a workload may depend on the function's arguments. The categorization can help to improve the accuracy of the usage data of a container. The rules for the categorization could be added by the original developer of the container image, or the image center can automatically categorize the data of the same container image from a different environment using different analyzing methods, such as a decision tree.

For example, if the categories are small, medium and large sizes of inputs, the image center will store the aggregated resource utilization data for each category. When a container needs to be scheduled, the container scheduler can make the decision based on the category of the inputs. Functions can be categorized according to their inputs and the usage of those categorizations in order to inform container scheduling decisions can be automated. These inputs may also be used in model training and/or inference generation.

Embodiments of the invention may also include edge deployment and federated learning. For edge deployment, instead of streaming telemetry data to a centralized location, which consumes unnecessary bandwidth, only insights are transmitted. Furthermore, a localized model and the centralized model can be pipelined together for better localization support.

Embodiments of the invention also enable preemptive autoscaling. Instead of waiting for resource to run out on containers, this invention provides a mechanism to predict and scale containers ahead of time. Knowledge of the required resources, execution time, available resources, and the like allows preemptive autoscaling. When LU resources, for example, are running low or are expected to run low or when demand increases, the ability of the scheduling engine to understand the resource usage requirements allows the function to be scaled as necessary preemptively.

Similarly, requests can be directed to containers with sufficient resources. This allows the workload or workloads to be more balanced across the available nodes.

Embodiments of the invention also enable predictive request rejection. Instead of having a request crashing a node when the cluster does not have sufficient resource, the resource usage can be determined in advance and the request can be rejected or delayed in order to protect existing workloads.

Instead of deployment in a centralized location, embodiments may be to be utilized in many edge sites (many clusters). In that case, the inference service will be executed on the edge site itself to provide real-time prediction based on the request input, so that the container scheduler can perform placement accordingly.

The predictive ability can also be used to reschedule a request to a different edge environment. In an edge environment, the capability of hardware is relative limited comparing to the traditional data center. Reaching to the limit of the capability of an edge station may happen much more often than the data center. By predicting whether an incoming or new request would make the current edge environment overloaded, the operator of the edge can decide to run the function in another nearby edge environment.

For example, a function using a Machine Learning model may require a certain amount of GPU during its lifetime. It does not require too much memory, CPU, or network resources. By adding this information to the function's container image, the resource usage of that function can be shared with others and with the platform.

Each time a container is executed, a certain amount of resources would be allocated for that container. Knowing what type of resources, or how much of those resources is being used, is very helpful for container scheduling platforms, such as Kubernetes. Such information could be attached to an image as key-value pairs. For example, the key could be the timespan since the start of the container and the value would be the resource consumptions such as CPU, GPU, RAM, network and/or disk utilization. With such information being attached to the container image, any existing platform can take advantage of this information for improved scheduling.

Embodiments of the invention may provide machine learning models such as neural networks that can be trained using one or more of resource usage data (raw and/or processed) of various forms (discrete, time series, etc.), container input (type category, size, function, class, etc.), third party services, or the like or combination thereof. The output may be a prediction related to resource usage requirements, execution time, or the like. This information may be used by a scheduler for many reasons including autoscaling, placement, resource management, or the like.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are LU set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of resource usage or scheduling operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more LU instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: receiving a request to invoke a container in a computing system, generating an inference from an inference service by providing an input to the inference service, wherein the inference includes a prediction of resources needed for the request, receiving environment data associated with the computing system, the environment data including information about resources available at nodes in the computing system, and scheduling the request to run in the computing system based on the inference and the environment data.

Embodiment 2. The method of embodiments 1, wherein the environment data comprises container metadata including hardware requirements, resource usage data, and service requirements.

Embodiment 3. The method of embodiments 1 and/or 2, further comprising training a model with telemetry data collected from running containers in the computing system.

Embodiment 4. The method of any one or more of embodiments 1-3, further comprising collecting telemetry data from each container on each node in the computing system.

Embodiment 5. The method of any one or more of embodiments 1-4, wherein the environment data includes resources consumed by each container at each node, resources available at each node, and execution times of each container.

Embodiment 6. The method of any one or more of embodiments 1-5, further comprising scheduling the request in an existing and running container, scheduling the request in a new container on a selected node, or rejecting the request.

Embodiment 7. The method of any one or more of embodiments 1-6, further comprising training a model using the telemetry data.

Embodiment 8. The method of any one or more of embodiments 1-7, further comprising aggregating the telemetry data.

Embodiment 9. A method for performing any of the operations, methods, or processes, or any portion of any of these, disclosed herein.

Embodiment 10. A non-transitory storage medium having stored therein instructions that are executable by one or more hardware processors to perform operations comprising the operations of any one or more of embodiments 1 through 10.

Embodiment 11. A resource usage platform comprising, an image center configured to store container images in a registry, the image center including: an inference service configured to generate inferences regarding resource requirements for function requests; and a training service configured to train a model to generate the inferences, a telemetry engine configured to collect telemetry data from each container operating on each node of a computing system, the telemetry data including resource usage data that is used to train the model, a scheduling engine configured to schedule the request in a container based on the inferences.

Embodiment 12. The resource usage platform of embodiment 11, wherein the scheduling engine schedules the request based on environment data that identifies resources used by each container on each node, resources free on each node, execution times of containers, metadata attached to the container images that identifies service needs and hardware requirements.

Embodiment 14. The resource usage platform of embodiment 11 and/or 12, wherein the resource usage platform is centralized.

Embodiment 15. The resource usage platform of embodiments 11, 12, and/or 13, wherein the platform includes one or more edge systems that each include at least a telemetry engine, a scheduling engine, and a model to generate the inferences.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable LU instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a request to invoke a container in a computing system from a container image;
   generating an inference from an inference service by providing an input to the inference service, wherein the inference includes a prediction of resources needed for the request;
   receiving environment data associated with the computing system, the environment data including information about resources available at nodes in the computing system;
   attaching services information to the container that describe services used by the container;
   scheduling the container to run on a node in the computing system based on the inference and the environment data and based on the services information attached to the container, wherein the node has access to the services; and
   running the container on the node.

2. The method of claim 1, wherein the environment data comprises container metadata including hardware requirements, resource usage data, and service requirements.

3. The method of claim 1, further comprising training a model with telemetry data collected from running containers in the computing system.

4. The method of claim 3, further comprising collecting telemetry data from each container on each node in the computing system.

5. The method of claim 1, wherein the environment data includes resources consumed by each container at each node, resources available at each node, and execution times of each container.

6. The method of claim 1, further comprising scheduling the request in an existing and running container, scheduling the request in a new container on a selected node, or rejecting the request.

7. The method of claim 1, further comprising training a model using telemetry data and/or aggregating the telemetry data.

8. The method of claim 1, further comprising auto scaling containers in the computing system and/or performing federating learning.

9. A non-transitory storage medium having stored therein instructions that are executable by one or more hardware processors to perform operations comprising:
   receiving a request to invoke a container in a computing system from a container image;
   generating an inference from an inference service by providing an input to the inference service, wherein the inference includes a prediction of resources needed for the request;
   receiving environment data associated with the computing system, the environment data including information about resources available at nodes in the computing system;
   attaching services information to the container that describe services used by the container;
   scheduling the container to run on a node in the computing system based on the inference and the environment data and based on the services information attached to the container, wherein the node has access to the services; and
   running the container on the node.

10. The non-transitory storage medium of claim 9, wherein the environment data comprises container metadata including hardware requirements, resource usage data, and service requirements.

11. The non-transitory storage medium of claim 9, further comprising training a model with telemetry data collected from running containers in the computing system.

12. The non-transitory storage medium of claim 11, further comprising collecting telemetry data from each container on each node in the computing system.

13. The non-transitory storage medium of claim 9, wherein the environment data includes resources consumed by each container at each node, resources available at each node, and execution times of each container.

14. The non-transitory storage medium of claim 9, further comprising scheduling the request in an existing and running container, scheduling the request in a new container on a selected node, or rejecting the request.

15. The non-transitory storage medium of claim 9, further comprising training a model using telemetry data and/or aggregating the telemetry data.

16. The non-transitory storage medium of claim 9, further comprising auto scaling containers in the computing system and/or performing federating learning.

* * * * *